US009551599B2

(12) United States Patent
Miller et al.

(10) Patent No.: US 9,551,599 B2
(45) Date of Patent: Jan. 24, 2017

(54) NORMALIZED PROCESS DYNAMICS (71) Applicant: Rosemount Inc., Chanhassen, MN (US)

(72) Inventors: John Philip Miller, Ardmore, OK (US); Robert Carl Hedtke, Young America, MN (US)

(73) Assignee: Rosemount Inc., Chanhassen, MN (US)

( * ) Notice: Subject to any disclaimer, the term of this patent is extended or adjusted under 35 U.S.C. 154(b) by 571 days.

(21) Appl. No.: 14/033,884

(22) Filed: Sep. 23, 2013

(65) Prior Publication Data

US 2015/0088279 A1 Mar. 26, 2015

(51) Int. Cl.
*G01D 18/00* (2006.01)
*G05B 23/02* (2006.01)
*G01K 7/00* (2006.01)
*G05B 15/02* (2006.01)

(52) U.S. Cl.
CPC ............. *G01D 18/00* (2013.01); *G01K 7/00* (2013.01); *G05B 15/02* (2013.01); *G05B 23/0221* (2013.01)

(58) Field of Classification Search
CPC .... G01D 18/00; G01D 18/002; G01D 18/004; G01D 18/006; G05B 23/0221; G05B 15/02; G05B 11/018; G05B 19/404; G01K 7/00
USPC .............................. 700/55; 702/190; 374/141
See application file for complete search history.

(56) References Cited

U.S. PATENT DOCUMENTS

| | | | | |
|---|---|---|---|---|
| 4,607,530 A * | 8/1986 | Chow | ...................... | G01L 9/085 702/138 |
| 5,735,604 A * | 4/1998 | Ewals | ................ | G03G 15/2039 374/134 |
| 6,446,444 B1 * | 9/2002 | Chase | ..................... | F02G 1/043 60/520 |
| 7,180,211 B2 * | 2/2007 | Sinha | ..................... | G01K 15/00 307/651 |
| 7,949,495 B2 | 5/2011 | Wiklund et al. | | |
| 2005/0149264 A1 * | 7/2005 | Tarvin | .................. | E21B 47/065 702/6 |
| 2006/0047480 A1 | 3/2006 | Lenz et al. | | |
| 2007/0010900 A1 * | 1/2007 | Kavaklioglu | ........ | C10G 11/187 700/26 |
| 2007/0186657 A1 * | 8/2007 | Sato | ........................ | G01L 9/085 73/708 |

(Continued)

FOREIGN PATENT DOCUMENTS

CN 101078913 11/2007
EP 1 285 841 A1 2/2003
(Continued)

OTHER PUBLICATIONS

First Chinese Office Action for Chinese Patent Application No. 201420191899.5, dated Jul. 4, 2014, 2 pages.
(Continued)

*Primary Examiner* — Lisa Caputo
*Assistant Examiner* — Philip Cotey
(74) *Attorney, Agent, or Firm* — Westman, Champlin & Koehler, P.A.

(57) ABSTRACT

A sensing system includes a filter construction module that constructs a high pass filter for filtering sensor values indicative of a process variable, the filter construction module setting values for parameters of the filter based on a temperature value indicative of a temperature of the sensor that produced the sensor values.

12 Claims, 10 Drawing Sheets

(56) References Cited

U.S. PATENT DOCUMENTS

| | | | | |
|---|---|---|---|---|
| 2008/0082294 A1* | 4/2008 | Pihlaja | ................. | G05B 23/024 |
| | | | | 702/179 |
| 2008/0208527 A1* | 8/2008 | Kavaklioglu | ........ | C10G 11/187 |
| | | | | 702/179 |
| 2009/0055457 A1* | 2/2009 | Miller | .................... | G05B 15/02 |
| | | | | 708/300 |
| 2009/0299543 A1* | 12/2009 | Cox | ........................ | G06F 1/203 |
| | | | | 700/299 |
| 2012/0303301 A1* | 11/2012 | Park | .................. | G01R 31/3662 |
| | | | | 702/63 |

FOREIGN PATENT DOCUMENTS

| | | |
|---|---|---|
| JP | 2009-505276 | 2/2009 |
| WO | WO 2006/107933 | 10/2006 |
| WO | WO 2010/039225 | 4/2010 |

OTHER PUBLICATIONS

Notification of Transmittal of the International Search Report and the Written Opinion of the International Searching Authority, PCT/US2014/049017, dated Nov. 10, 2014.

Communication from European Patent Application No. EP 14755223.6, dated May 2, 2016.

Office Action from Canadian Patent Application No. 2,923,136, dated May 30, 2016.

Office Action from Chinese Patent Application No. EP 201410157723.2 dated Oct. 8, 2016.

\* cited by examiner

NORMALIZED PROCESS DYNAMICS

BACKGROUND

In processing plants, gases and liquids are routed through various conduits and tanks. In order to control the operation of the plant, the current status of the liquids and gases in the various portions of the plant as well as the state of controlled devices such as valves and burners must be monitored. The variables monitored to determine these states are referred to generally as process variables and can include pressures, differential pressures, temperatures, tank levels, valve positions, and the like. These process variables are determined using one or more sensors which generate an electrical signal indicative of the process variable. Because processing plants are dynamic, the electrical signals produced for the process variables are also dynamic and tend to vary significantly over time.

In the past, filtering had been used to remove or dampen the variations in the process signals. More recently, statistical process monitoring (SPM) has been introduced in which the dynamics of the process variables are used as one measure of the state of the process variable. Under SPM, a median or mean of the process variable signal can be determined to represent the process variable itself while a standard deviation or coefficient of variation can be calculated to provide a measure of the dynamic nature of the process variable.

Some process variables have a normal amount of variation or a normal standard deviation. When the standard deviation increases above or significantly below the normal amount of standard deviation, it can be indicative of abnormal conditions within a portion of the processing plant. For example, if the standard deviation of a differential pressure sensor drops, it can be indicative of a plugged impulse line.

The statistical values, collectively referred to as SPM data, are generally determined by electronics within field devices such as sensors, transmitters and valve controls that are located within the processing environment. These field devices can be configured to generate alerts when the SPM data crosses a threshold indicating abnormal operation. These alerts are sent to a host system, which can make the alert visible to an operator. Alternatively, the field device can transmit the SPM data to the host system via a digital communication protocol. The host system can be configured to generate alarms when the SPM data crosses various thresholds. In addition, multi-variant statistical analysis can be performed on the SPM data at the host system.

SUMMARY

A process field device includes a sensor providing a signal indicative of a process variable and a temperature sensor providing a signal indicative of a temperature of the sensor. Converter circuitry converts the sensor signal into sensor values and the temperature sensor signal into temperature values. A processor implements a digital filter that filters the sensor values to produce filtered sensor values and executes statistical process monitoring instructions that compute a statistical value from the filtered sensor values, wherein the digital filter is temperature-dependent such that the filter changes as the temperature values change.

A sensing system includes a filter construction module that constructs a high pass filter for filtering sensor values indicative of a process variable, the filter construction module setting values for parameters of the filter based on a temperature value indicative of a temperature of the sensor that produced the sensor values.

In further embodiments, a control system includes a temperature-dependent filter that filters a series of sensor values in response to a temperature value to produce filtered values. The control system further includes a statistical process monitoring unit that determines a statistical value from the filtered values and that issues an alert when the statistical value crosses a threshold.

In a method, coefficients for temperature-dependent filter parameters are trained. A sensor signal and a temperature signal are received and a filter is constructed using the temperature-dependent filter parameters and the temperature signal. The sensor signal is applied to the filter to produce a filtered signal and a statistical value is generated from the filtered signal. An alarm is activated when the statistical value crosses a threshold.

DETAILED DESCRIPTION OF ILLUSTRATIVE EMBODIMENTS

Figure 1:
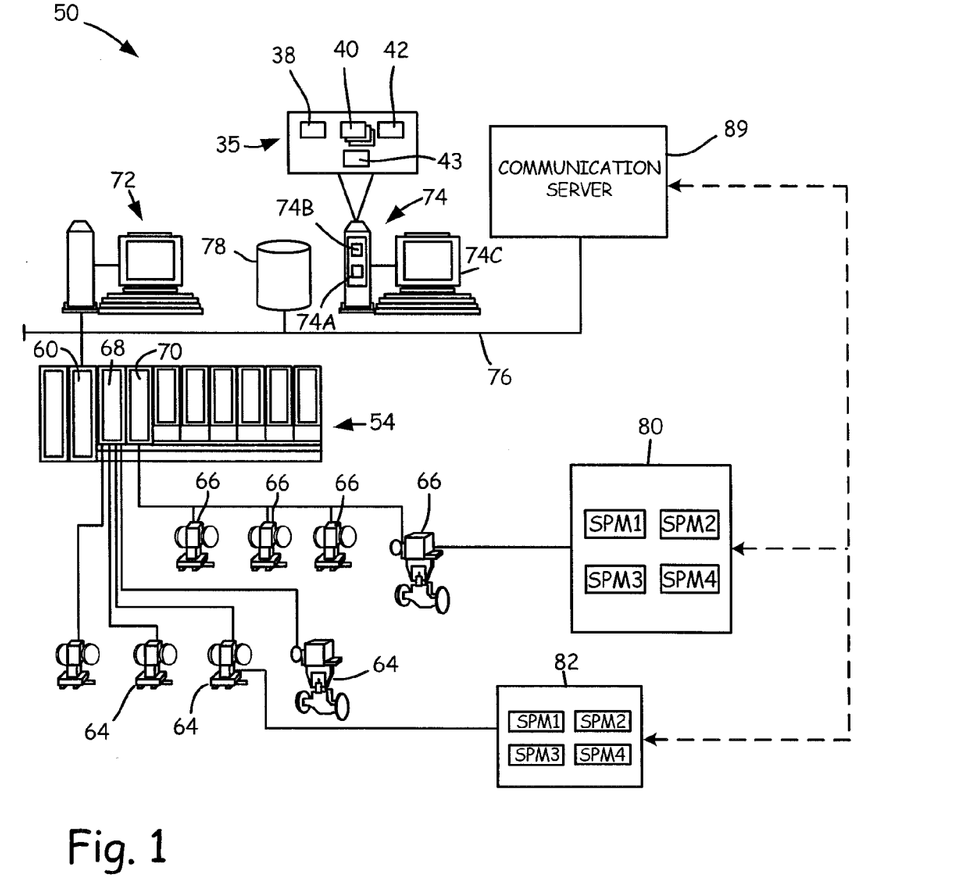
FIG. 1 is a block diagram of a processing plant.

FIG. 1 illustrates a portion 50 of a process plant for the purpose of describing one manner in which statistical data collection and processing and in some cases abnormal situation detection may be performed by components associated with an abnormal situation prevention system 35. The abnormal situation prevention system includes configuration and data collection application 38, a viewing or interface application 40, which may include statistical collection and processing blocks, and a rules engine development and execution application 42. Situation prevention system 35 additionally stores a statistical process monitoring database 43 that stores statistical data generated from various process parameters.

The portion 50 of the process plant illustrated in FIG. 1 includes a distributed process control system 54 having one or more process controllers 60 connected to one or more field devices 64 and 66 via input/output (I/O) cards or devices 68 and 70, which may be any desired types of I/O devices conforming to any desired communication or controller protocol. The field devices 64 are illustrated as HART field devices and the field devices 66 are illustrated as Fieldbus field devices, although these field devices could use any other desired communication protocols and may communicate through a wired or wireless communication structure such as Ethernet, fiberoptic, and WirelessHART® for example. Additionally, the field devices 64 and 66 may be any types of devices such as, for example, sensors, valves, transmitters, positioners, etc., and may conform to any desired open, proprietary or other communication or programming protocol, it being understood that the I/O devices 68 and 70 must be compatible with the desired protocol used by the field devices 64 and 66.

In any event, one or more user interfaces or computers 72 and 74 (which may be any types of personal computers, workstations, etc.) accessible by plant personnel such as configuration engineers, process control operators, maintenance personnel, plant managers, supervisors, etc. are coupled to the process controllers 60 via a communication line or bus 76 which may be implemented using any desired hardwired or wireless communication structure, and using any desired or suitable communication protocol such as, for example, an Ethernet protocol. In addition, a database 78 may be connected to the communication bus 76 to operate as a data historian that collects and stores configuration information as well as online process variable data, parameter data, status data, and other data associated with the process controllers 60 and field devices 64 and 66 within the process plant 10. Thus, the database 78 may operate as a configuration database to store the current configuration, including process configuration modules, as well as control configuration information for the process control system 54 as downloaded to and stored within the process controllers 60 and the field devices 64 and 66. Likewise, the database 78 may store historical abnormal situation prevention data, including statistical data collected and/or generated by the field devices 64 and 66 within the process plant or statistical data determined from process variables collected by the field devices 64 and 66.

While the process controllers 60, I/O devices 68 and 70, and field devices 64 and 66 are typically located within and distributed throughout the sometimes harsh plant environment, the workstations 72 and 74, and the database 78 are usually located in control rooms, maintenance rooms or other less harsh environments easily accessible by operators, maintenance personnel, etc.

Generally speaking, the process controllers 60 store and execute one or more controller applications that implement control strategies using a number of different, independently executed, control modules or blocks. The control modules may each be made up of what are commonly referred to as function blocks, wherein each function block is a part or a subroutine of an overall control routine and operates in conjunction with other function blocks (via communications called links) to implement process control loops within the process plant. As is well known, function blocks, which may be objects in an object-oriented programming protocol, typically perform one of an input function, such as that associated with a transmitter, a sensor or other process parameter measurement device, a control function, such as that associated with a control routine that performs PID, fuzzy logic, etc. control, or an output function, which controls the operation of some device, such as a valve, to perform some physical function within the process plant. Of course, hybrid and other types of complex function blocks exist, such as model predictive controllers (MPCs), optimizers, etc. It is to be understood that while the Fieldbus protocol and the DeltaV™ system protocol use control modules and function blocks designed and implemented in an object-oriented programming protocol, the control modules may be designed using any desired control programming scheme including, for example, sequential function blocks, ladder logic, etc., and are not limited to being designed using function blocks or any other particular programming technique.

As illustrated in FIG. 1, the maintenance workstation 74 includes a processor 74A, a memory 74B and a display device 74C. The memory 74B stores the abnormal situation prevention applications 38, 40 and 42 in a manner that these applications can be implemented on the processor 74A to provide information to a user via the display 74C (or any other display device, such as a printer).

Additionally, as shown in FIG. 1, some (and potentially all) of the field devices 64 and 66 include data collection and processing blocks 80 and 82. While, the blocks 80 and 82 are described with respect to FIG. 1 as being advanced diagnostics blocks (ADBs), which are known Foundation Fieldbus function blocks that can be added to Fieldbus devices to collect and process statistical data within Fieldbus devices, for the purpose of this discussion, the blocks 80 and 82 could be or could include any other type of block or module located within a process device that collects device data and calculates or determines one or more statistical measures or parameters for that data, whether or not these blocks are located in Fieldbus devices or conform to the Fieldbus protocol. While the blocks 80 and 82 of FIG. 1 are illustrated as being located in one of the devices 64 and in one of the devices 66, these or similar blocks could be located in any number of the field devices 64 and 66, could be located in other devices, such as the controller 60, the I/O devices 68, 70, in an intermediate device that is located within the plant and that communicates with multiple sensors or transmitters and with the controller 60, or in workstations 72 or 74. Additionally, the blocks 80 and 82 could be in any subset of the devices 64 and 66.

Generally speaking, the blocks 80 and 82 or sub-elements of these blocks, collect data, such a process variable data, and perform statistical processing or analysis on the data. For example, the block 80 includes a set of four statistical process monitoring (SPM) blocks or units SPM1-SPM4 which may collect process variable or other data and perform one or more statistical calculations on the collected data to determine, for example, a mean, a median, a standard deviation, a root-mean-square (RMS), a rate of change, a range, a minimum, a maximum, etc. of the collected data and/or to detect events such as drift, bias, noise, spikes, etc., in the collected data. Neither the specific statistical data generated, nor the method in which it is generated is critical. Thus, different types of statistical data can be generated in addition to, or instead of, the specific types described above. Additionally, a variety of techniques, including known techniques, can be used to generate such data. The term statistical process monitoring (SPM) block is used herein to describe functionality that performs statistical process monitoring on at least one process variable or other process parameter, and may be performed by any desired software, firmware or hardware within the device or even outside of a device for which data is collected.

As another example, the block 82 of FIG. 1, which is illustrated as being associated with a transmitter 82 includes a set of four SPM blocks or units SPM1-SPM4 which may collect process variable or other data within the transmitter and perform one or more statistical calculations on the collected data to determine, for example, a mean, a median, a standard deviation, etc. of the collected data. While the blocks 80 and 82 are illustrated as including four SPM blocks each, the blocks 80 and 82 could have any other number of SPM blocks therein for collecting data and determining statistical measures associated with that data. While the SPM blocks discussed herein may be known Foundation Fieldbus SPM blocks, the term statistical process monitoring (SPM) block is used herein to refer to any type of block or element that collects data, such as process variable data, and performs some statistical processing on this data to determine a statistical measure, such as a mean, a standard deviation, etc. As a result, this term is intended to cover software or firmware or other elements that perform this function, whether these elements are in the form of function blocks, or other types of blocks, programs, routines or elements and whether or not these elements conform to the Foundation Fieldbus protocol, or some other protocol, such as PROFIBUS, WORLDFIP, Device-Net, AS-Interface, HART, CAN, etc., protocols.

The parameters of the SPM blocks within the field devices may be made available to an external client such as workstation 74 through the bus or communication network 76 and the controller 60. Additionally or in the alternative, the parameters and other information gathered by or generated by the SPM blocks within blocks 80 and 82 may be made available to the workstation 74 through, for example, a Communication Server 89. This connection may be a wireless connection, a hardwired connection, an intermittent connection (such as one that uses one or more handheld devices) or any other desired communication connection using any desired or appropriate communication protocol. Of course, any of the communication connections described herein may use a communication server to integrate data received from different types of devices in a common or consistent format.

In current SPM based facilities, alerts are set by setting thresholds for the various SPM parameters such as median/mean and standard deviation. It has been known that field devices set to operate at different sensing ranges should use different thresholds for their alarm limits. In general, sensors that are operating in ranges used to detect smaller changes in values of a process variable should have smaller alarm limits than sensors operating at larger ranges.

The present inventors have further discovered that to take full advantage of SPM the effects of transmitter temperature, range, and manufacturing variability and the effects of impulse line temperature should be minimized. This would provide more repeatable measurements and better SPM alerts under different operating conditions.

Figure 2:
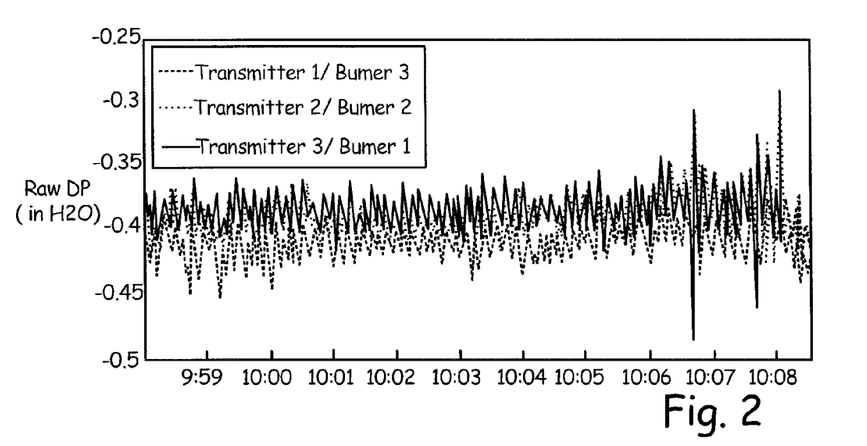
FIG. 2 is a graph of raw differential pressure sensor signals produced by three transmitters.
Figure 3:
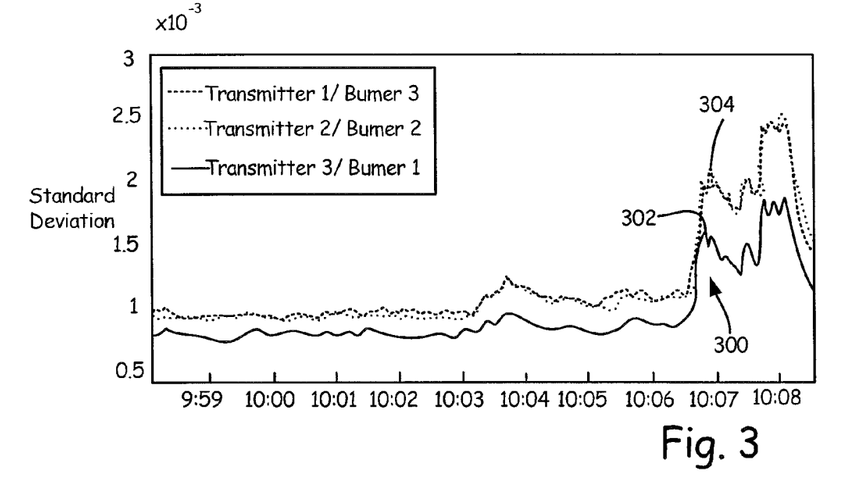
FIG. 3 is a graph of the standard deviations of the differential pressure signals of FIG. 2.

FIG. 2 shows an example of a raw differential pressure sensor signal for three separate transmitters. FIG. 3 shows a standard deviation for each of the differential pressure sensor signals of FIG. 2. As shown in FIG. 3, the variation in the standard deviation between transmitter 3 and transmitters 1 and 2 is significant during flame instability point 300, with transmitter 3 having a standard deviation peak 302 that is significantly lower than peak 304 for transmitters 1 and 2. Thus, FIG. 3 shows there is a variation in the standard deviation between transmitters operating at a same range and at a same temperature.

Standard deviation values are also affected by the frequency of the process variations within the conduit or tank. At higher frequencies, the sensors are incapable of responding quickly enough to sense the changes in the process variable and as a result, the standard deviation of the process signal at higher frequencies tends to drop. In other words, the standard deviation has non-constant frequency response. In addition, the frequency response of the standard deviation changes with the temperature of the sensor. In general, the sensors respond more slowly when they are colder resulting in a lower standard deviation at colder temperatures across all frequencies.

Figure 4:
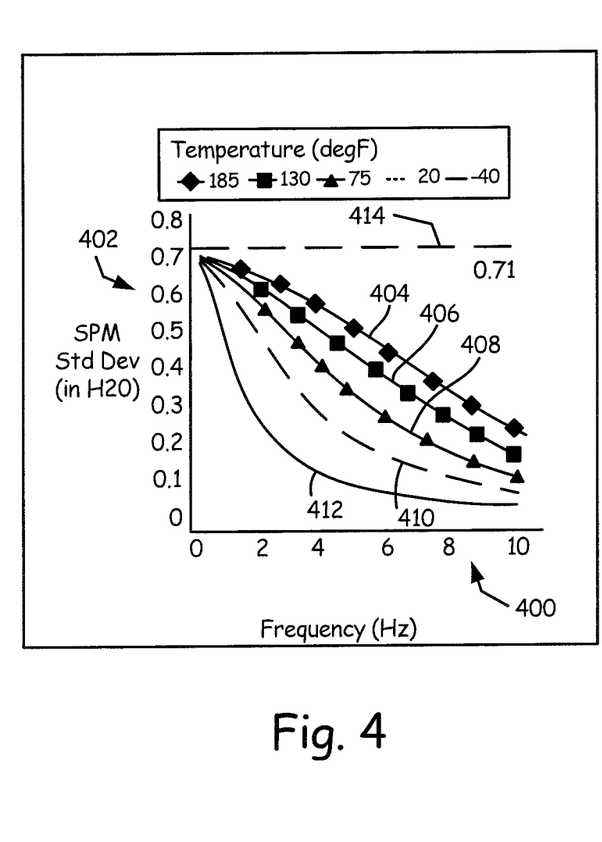
FIG. 4 provides graphs of standard deviation as a function of frequency for various temperatures of a differential pressure sensor.

FIG. 4 provides a graph of the frequency response of the standard deviation of a differential pressure sensor at a collection of temperatures. In FIG. 4, frequency is shown along horizontal axis 400 and the standard deviation of the differential pressure is shown along vertical axis 402. Frequency response curves 404, 406, 408, 410 and 412 represent the standard deviation frequency response for a differential pressure sensor at 185° F., 130° F., 75° F., 20° F., and −40° F., respectively. FIG. 4 also shows an ideal standard deviation 414, which represents the standard deviation of a sine wave of magnitude 1. This ideal standard deviation has a value of 0.71 for all frequencies and temperatures.

The frequency response of the standard deviation produced by the sensors is undesirable because it has a significant value at 0 Hz. Because of this, if the frequency response of the standard deviation is used directly, step changes in the process would trigger alerts since the standard deviation would respond strongly to such step changes. To avoid this, the art has applied a high pass filter to the sensor signal before computing the standard deviation so that the frequency response of the standard deviation is 0 at 0 Hz.

Figure 5:
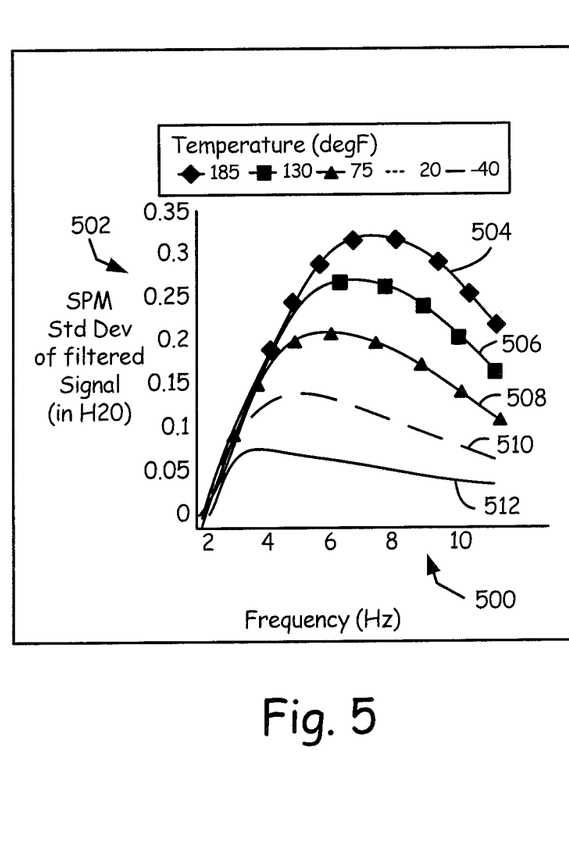
FIG. 5 provides graphs of standard deviation as a function of frequency at various temperatures for differential pressure signals that have been filtered by a high pass difference filter.

FIG. 5 provides graphs of standard deviations of filtered sensor signals at different temperatures. In FIG. 5, frequency is shown along horizontal axis 500 and the standard deviations of high-pass filtered values are shown along vertical axis 502. In FIG. 5, graphs 504, 506, 508, 510 and 512 represent the standard deviation frequency response of the filtered signal for the sensor operating at 185, 130, 75, 20, and −40 degrees Fahrenheit, respectively. As can be seen from FIG. 5, even after applying a high pass filter, the frequency response of the standard deviation varies significantly depending on the temperature of the sensor. As a result, it is difficult to set alarms for the standard deviation in environments where the temperature of the sensor may be changing or where similar sensors are used in a processing plant under differing operating temperatures.

Figure 6:
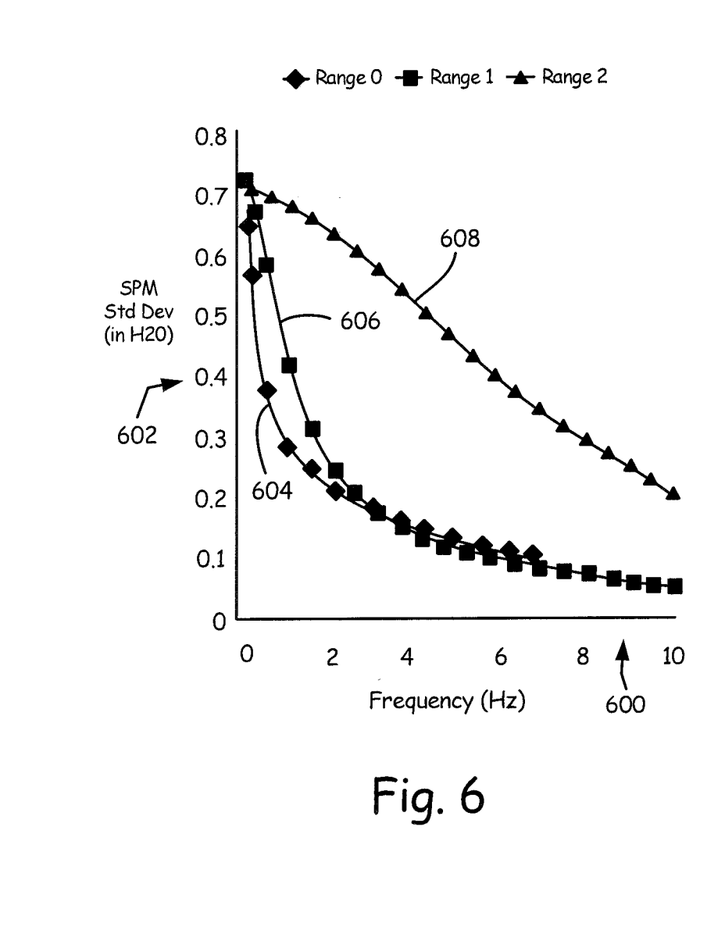
FIG. 6 provides graphs of standard deviation as a function of frequency for a collection of operating ranges for a differential pressure sensor.
Figure 7:
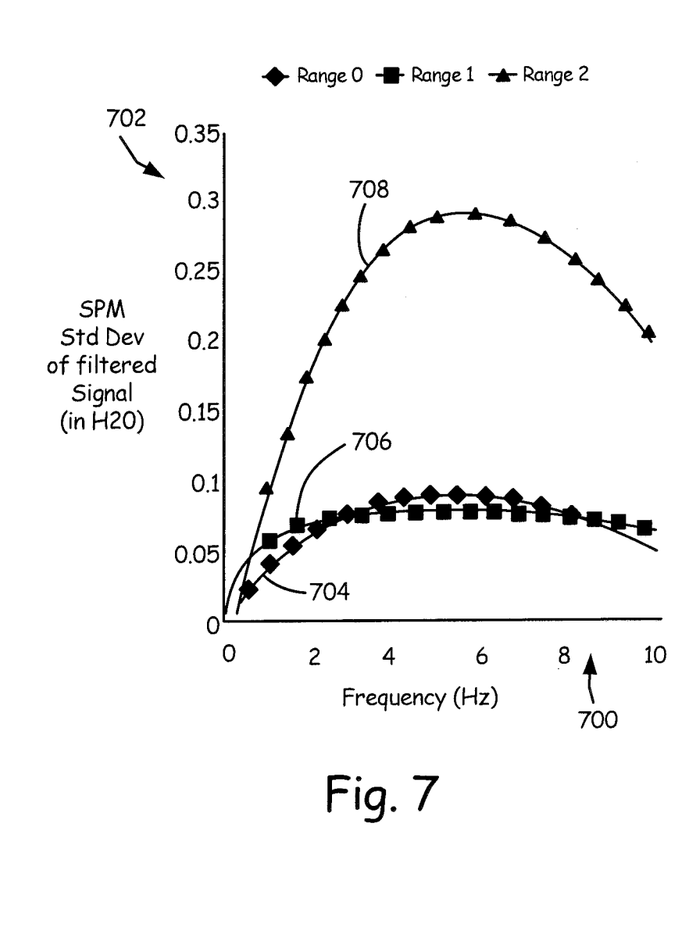
FIG. 7 provides graphs of standard deviation as a function of frequency for a collection of operating ranges for a differential pressure sensor signal filtered by a high pass difference filter.

FIGS. 6 and 7 show variations in the frequency response of the standard deviation of a differential pressure sensor signal due to changes in the operating range of the differential pressure sensor. In FIG. 6, frequency is shown along horizontal axis 600 and standard deviation is shown along vertical axis 602. Graphs 604, 606 and 608 provide frequency responses of the standard deviation for a sensor operating at range 0, range 1, and range 2, respectively. As can be seen in FIG. 6, differential pressure sensors have significantly different standard deviation frequency responses when operated at different ranges. FIG. 7 provides graphs of the frequency responses of FIG. 6 when the signal is filtered by a high pass difference filter before the standard deviation is determined. In FIG. 7, frequency is shown along horizontal axis 700 and standard deviation values are shown along vertical axis 702. Graphs 704, 706 and 708 provide the frequency responses for the standard deviation of filtered signals produced by sensors operating at range 0, range 1 and range 2, respectively. As seen in FIG. 7, the standard deviation frequency responses of the filtered signals also differ significantly for differential pressure sensors operating at different ranges.

Embodiments described herein provide a dynamic high pass filter designed to normalize the standard deviation frequency response to remove variations due to temperature, sensor range, and manufacturing variability. By normalizing the standard deviation frequency response, embodiments described herein make it possible to set common standard deviation alert thresholds for sensors operating at different temperatures, at different ranges, and for sensors manufactured in different ways.

Figure 8:
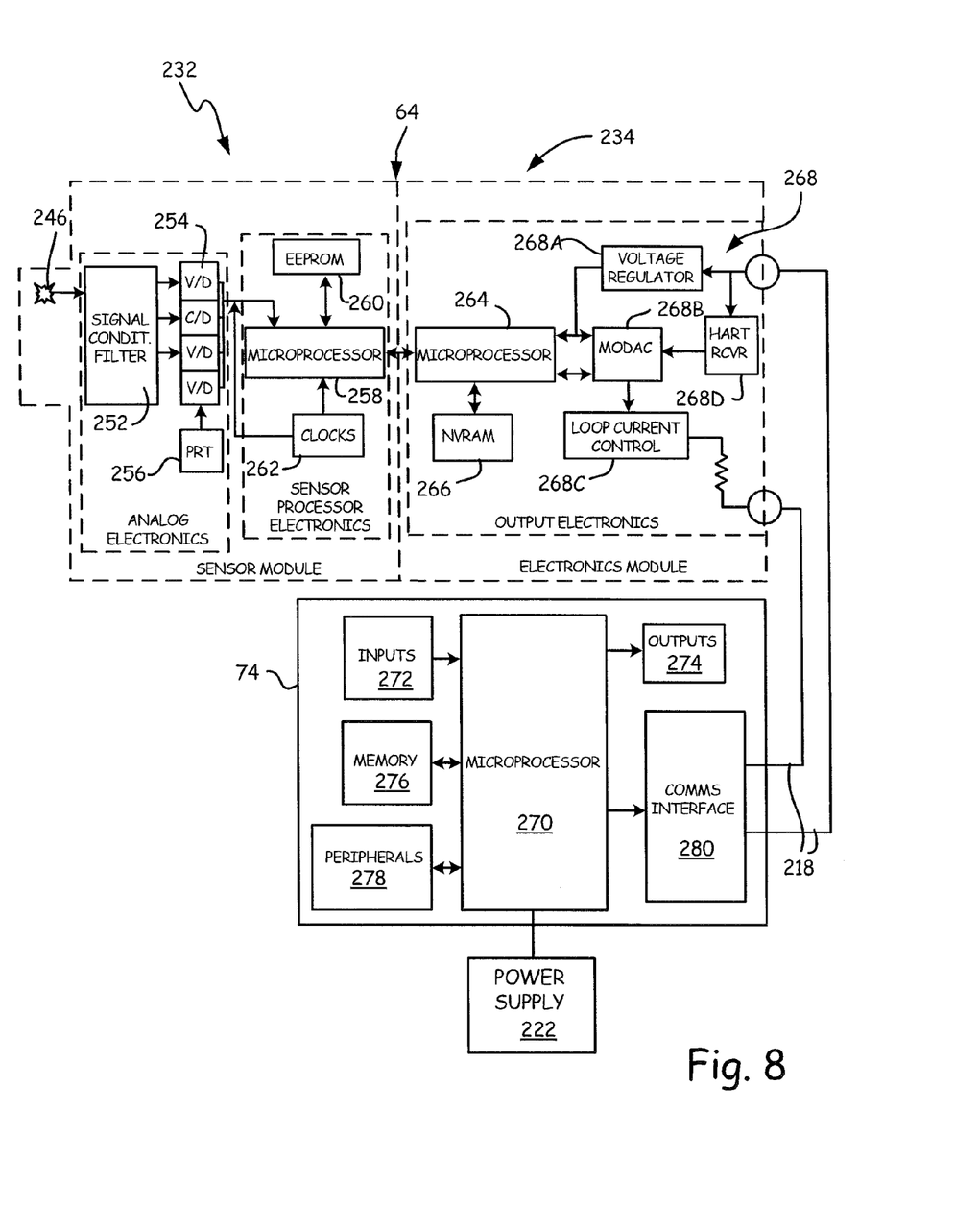
FIG. 8 is a block diagram of circuit elements in a field device and workstation used to implement various embodiments.

According to an embodiment of the invention, FIG. 8 shows a circuit diagram of device 64 and work station 74 of FIG. 1. Device 64 is shown to include a sensor module 232 and a circuitry module 234. Sensor module 232 includes sensor 246, analog electronics and sensor processor electronics. Device circuitry module 234 includes output electronics. Analog electronics in sensor module 232 include conditioning circuitry 252, converter circuitry 254 and platinum resistance thermometer (PRT) 256. Sensor processor electronics include sensor microprocessor 258, memory 260 and clock 262. Output electronics include output microprocessor 264, memory 266, and communication circuitry 268. Workstation 74 includes microprocessor 270, inputs 272, outputs 274, memory 276, peripherals 278 and communications interface 280. A power supply 222 provides power to workstation 74 as well as device 64 through workstation 74.

In this embodiment, sensor 246 senses a process variable such as static pressure, differential pressure, temperature, and valve position, for example. Although only a single sensor is shown for simplicity, device 64 may have multiple different sensors. Analog output from sensor 246 is transmitted to conditioning circuitry 252, which amplifies and conditions (e.g. filters) the signals. Converter circuitry 254 converts the analog signals generated by sensor 246 into digital signals usable by microprocessor 258. As shown in FIG. 8, converter circuitry includes both voltage-to-digital (V/D) and capacitance-to-digital (C/D) converters. PRT 256 provides a temperature signal to converter circuitry 254 indicative of the temperature near sensor 246 so that the sensor signals can be compensated for temperature variations. Microprocessor 258 receives digitized and conditioned sensor signals from converter circuitry 254 including a digitized temperature signal from PRT 256. Microprocessor 258 compensates and linearizes the sensor signals for sensor-specific errors and non-linearity using correction constants stored in memory 260. Clock 262 provides microprocessor 258 with clock signals. Digitized, compensated and corrected sensor signals are then transmitted to microprocessor 264.

Microprocessor 264 analyzes the sensor signals to determine a process state. In particular, memory 266 (which may be non-volatile random access memory (NVRM)) includes lookup tables in which are stored algorithm coefficients which are used to determine particular values of process state, such as mass flow rate, based on the magnitude of the sensed process variables. Additionally, hardware parameters and process fluid parameters, such as the type and the bore diameter of a pipe carrying the process fluid and the viscosity and density of the process fluid, are uploaded into memory 266 through control loop 218. In other embodiments, data relating to hardware parameters and fluid parameters are directly entered into transmitter 264 through a user interface (not indicated in FIG. 8). Furthermore, process fluid parameters may be a function of the process variables such that various process fluid parameters are stored in the lookup tables and selected based on other fluid parameters and the sensed process variables.

Using hardware parameters, process fluid parameters, sensed process variables, and algorithm coefficients, microprocessor 264 performs a run-time calculation. The runtime calculation evaluates a process condition equation, to determine a process condition or state of the fluid, such as the mass flow rate. A process condition signal representing the calculated process condition and the sensor signals are transmitted to workstation 74 over control loop 218 using communication circuitry 268. Communication circuitry 268 includes voltage regulator 268A, modulator circuitry 268B, loop current controller 268C and a protocol receiver, such as a 4-20 mA HART® receiver or transceiver 268D, to enable transmitter circuitry module 234 to communicate with communication interface 280 of workstation 74.

NVRAM 266 also contains instructions for statistical process monitoring (SPM). These instructions are executed in parallel with the instructions used to generate the process state. The SPM instructions compute statistical values from the sensor signals such as the mean/median, standard direction, etc. of one or more of the sensor signals. In particular, and as detailed below, the SPM instructions cause microprocessor 264 to perform steps in which a high pass filter is dynamically constructed to provide a desired frequency response to the statistical values created by the SPM. In accordance with some embodiments, the constructed high pass filter compensates for temperature changes at the sensor, changes in the sensor's frequency response due to the range setting of the sensor, and manufacturing variabilities in the sensor.

In accordance with some embodiments, NVRAM 266 also holds alert thresholds and microprocessor 264 is able to determine when a statistical value crosses a threshold, when this occurs, microprocessor conveys the alert along with a Time Stamp to workstation 74 using communication circuitry 268.

In the alternative, or in addition, the statistical values produced by microprocessor 264 are sent to workstation 74 through communication circuitry 268. Workstation 74 can store the statistical values in a memory 276 and can display historical statistical values on an output monitor 274. Microprocessor 270 of workstation 74 can compare the statistical values to thresholds stored in memory 276 and can issue an alert when a statistical value crosses a threshold. Note that a threshold may be crossed by going above or below a given threshold.

Workstation 74 typically comprises a personal computer, such as a portable computer, installed near an industrial process to monitor and regulate process variables and process conditions of the industrial process. Workstation 74 includes inputs 272, such a keyboard, mouse, or other user interface, that enable operators to input process control inputs into memory 276. Workstation 74 also includes outputs 274, such as a monitor, which enable data to be extracted from workstation 274. Peripherals 278, such as a printer or other commonly used devices, can also be connected to workstation 74 to input and extract data from microprocessor 270. Workstation 74 includes communications interface 280, which transmits data to and receives data from microprocessor 264. Workstation 74 is configured to provide complete evaluation and analysis of the capabilities of module 234 and the sensor signals generated by sensor 246.

Figure 9:
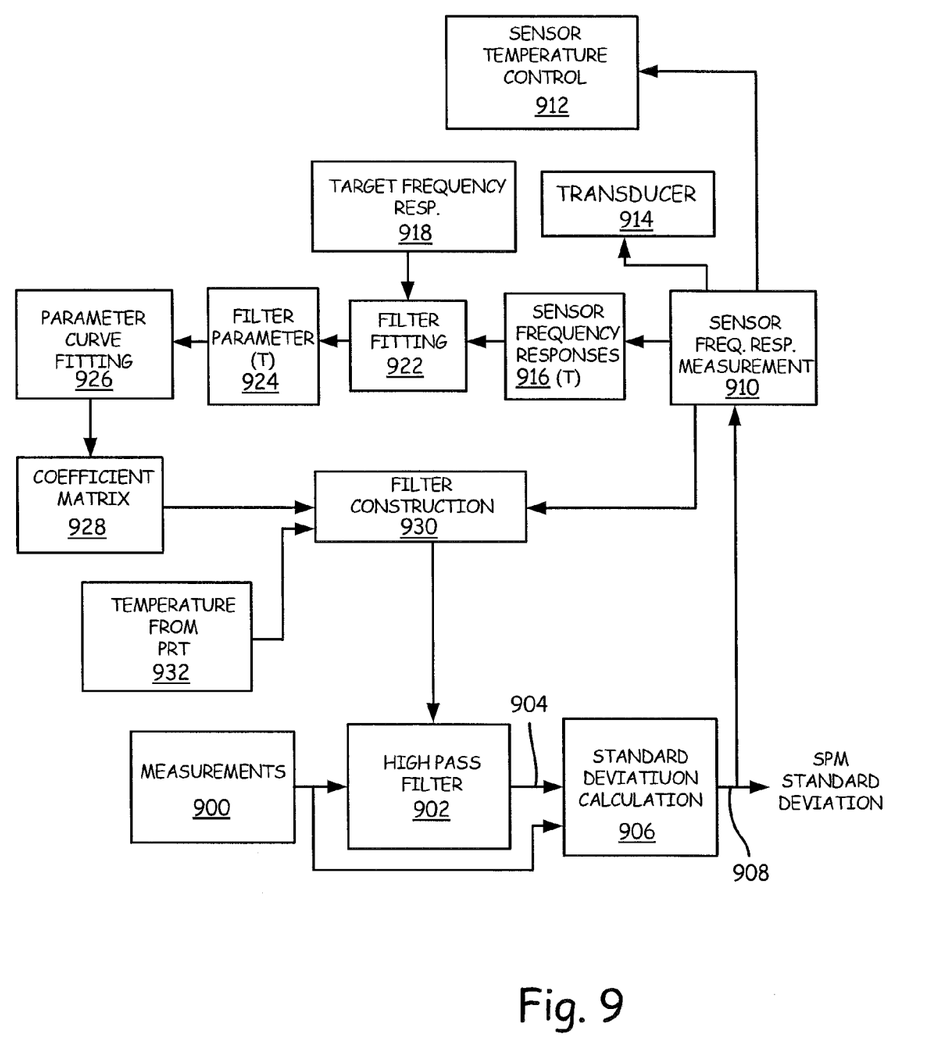
FIG. 9 is a block diagram of software elements used to implement various embodiments.

FIG. 9 provides a block diagram of software elements executed by microprocessor 264 to compute the standard deviation and to dynamically construct and use a high pass filter that normalizes the standard deviation. In FIG. 9, sensor measurements 900 representing a series or sequence of digital sensor values provided by microprocessor 258 of FIG. 8 are received by microprocessor 264 and are applied to a high pass filter 902 to produce filtered sensor values 904. Filtered sensor values 904 are applied to a standard deviation calculation 906 to produce SPM standard deviation 908.

Figure 10:
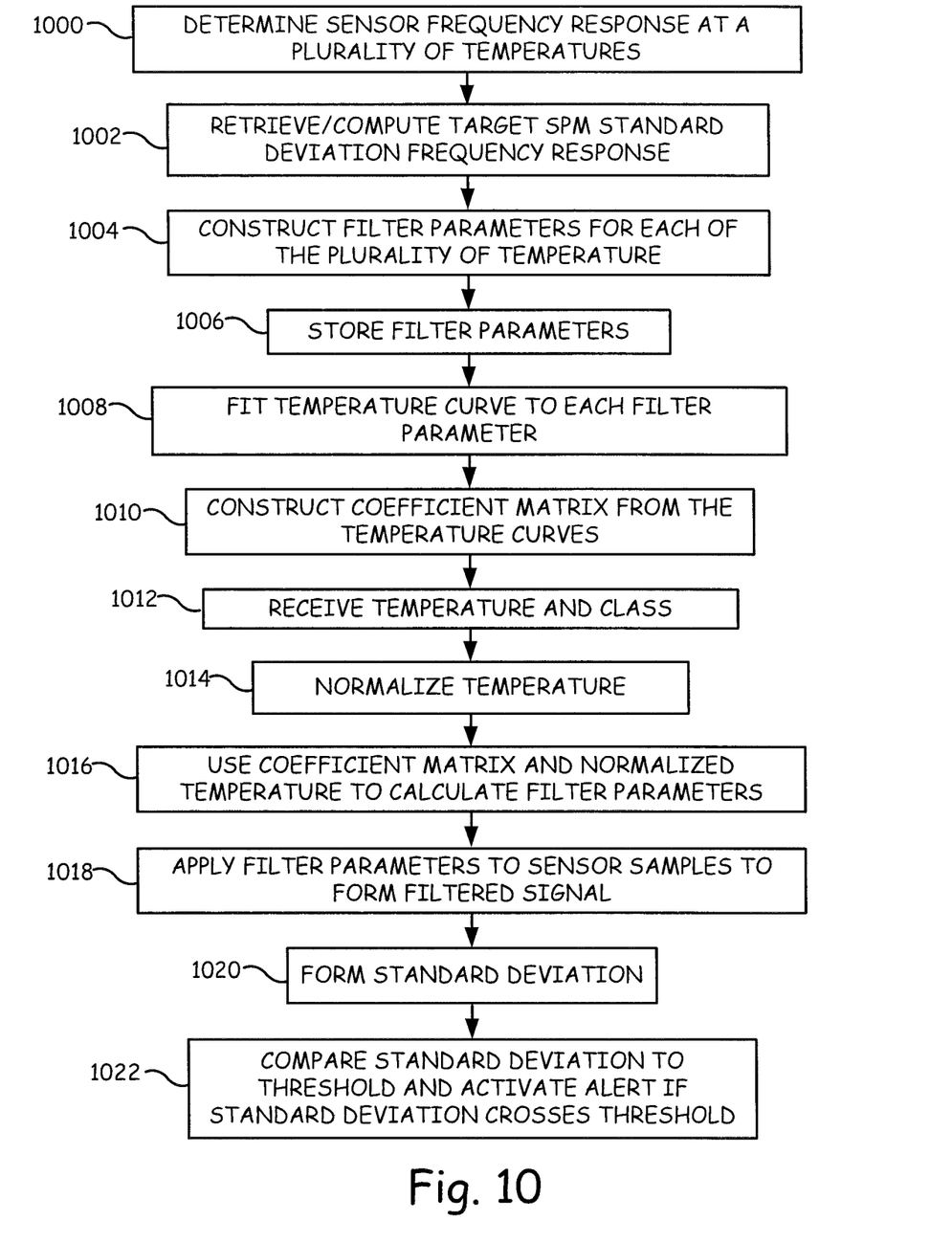
FIG. 10 is a flow diagram of a method of constructing and using a high pass filter.

FIG. 10 provides a flow diagram of a method for dynamically constructing high pass filter 902 so that the frequency response of standard deviation 908 matches a target or desired frequency response. At step 1000, a sensor frequency response measurement unit 910 determines the sensor frequency response at a plurality of temperatures. To do this, sensor frequency response measurement unit 910 first sets the temperature of the sensor using a sensor temperature control 912. In various embodiments, sensor temperature control 912 is able to regulate the temperature of the sensor. In accordance with one embodiment, sensor temperature control 912 is able to set the sensor at five different temperatures: 185° F., 130° F., 75° F., 20° F. and −40° F. Sensor frequency response measurement unit 910 instructs sensor temperature control 912 to set the sensor at one of the plurality of temperatures. Frequency response measurement unit 910 then activates a transducer 914 that causes sinusoidal variations in the feature of the fluid being measured by the sensor such as the pressure or level of the fluid, for example. In particular, unit 910 causes transducer 914 to create sinusoidal variations at a particular frequency. The sensor signal produced in response to the input signal provided by transducer 914 is then provided as measurements 900, which bypass high pass filter 902 without being filtered. The unfiltered sensor values are provided to standard deviation calculation 906, which computes a standard deviation of the unfiltered sensor measurements. The standard deviation of the unfiltered sensor measurements are then provided to sensor frequency response measurement unit 910. Frequency response measurement unit 910 stores the standard deviation value for the frequency of the sinusoidal variation introduced by transducer 914 as part of the sensor's frequency response 916.

Frequency response measurement unit 910 then instructs transducer 914 to change the frequency of the fluid variation and the sensor's resulting measurements are converted into a standard deviation once again. This new standard deviation value is then stored by frequency response measurement unit 910. In this way, frequency response measurement unit 910 is able to determine a standard deviation value for a plurality of frequencies and thus can determine the frequency response of the standard deviation for the sensor at a given temperature. When the complete frequency response has been determined at a selected temperature, frequency response measurement unit 910 instructs sensor temperature control 912 to change the temperature of the sensor to a new temperature value. At the new temperature value, frequency response measurement unit 910 once again instructs transducer 914 to vary the fluid at various different frequencies to obtain a frequency response of the standard deviation at the new temperature. By repeating these steps for each temperature, frequency response measurement unit 910 produces sensor frequency responses 916, which includes a frequency response for the sensor at each selected temperature.

Figure 11:
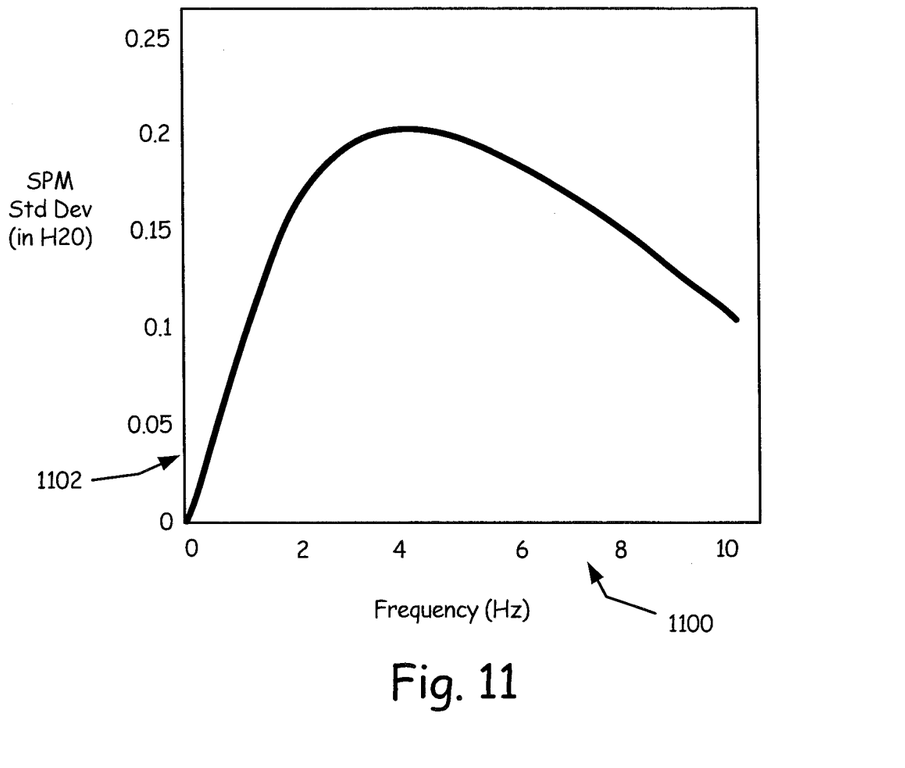
FIG. 11 is a graph of a target frequency response for a standard deviation of a differential pressure signal.

At step 1002, a target standard deviation frequency response 918 is retrieved or computed by microprocessor 264. In accordance with one embodiment, the target frequency response is the standard deviation frequency response of a filtered sensor signal produced by a model sensor operating at a selected temperature and at the same range as the sensor in the field device and filtered by a high pass difference filter. An example of such a target frequency response is shown in FIG. 11 where frequency is shown along horizontal axis 1100 and the standard deviation of the filtered sensor signal produced by a model sensor at a selected temperature is shown on vertical axis 1102. In accordance with one embodiment, the selected temperature is room temperature. By constructing the filter so that the standard deviation frequency response matches the target frequency response of FIG. 11, it is possible to filter the sensor measurements taken at different temperatures so as to normalize the frequency response of the standard deviation across temperatures. This is accomplished by dynamically changing the filter as the temperature changes so that regardless of the sensor temperature, the same standard deviation frequency response is achieved.

In other embodiments, the target frequency response is the standard deviation frequency response of a filtered sensor signal produced by a model sensor operating at a selected temperature and in a selected range regardless of the range of the present sensor and filtered by a high pass difference filter. Because the model sensor is operating at a selected range, the range of the model sensor will be different from the range of the sensor in the field device at times. By selecting a target frequency response produced by a model sensor operating at a selected temperature and at a selected range without regards to the range of the sensor in the field device, the frequency response of the standard deviation can be normalized so that variations due to temperature and operating range of the sensor in the device are removed.

Figure 12:
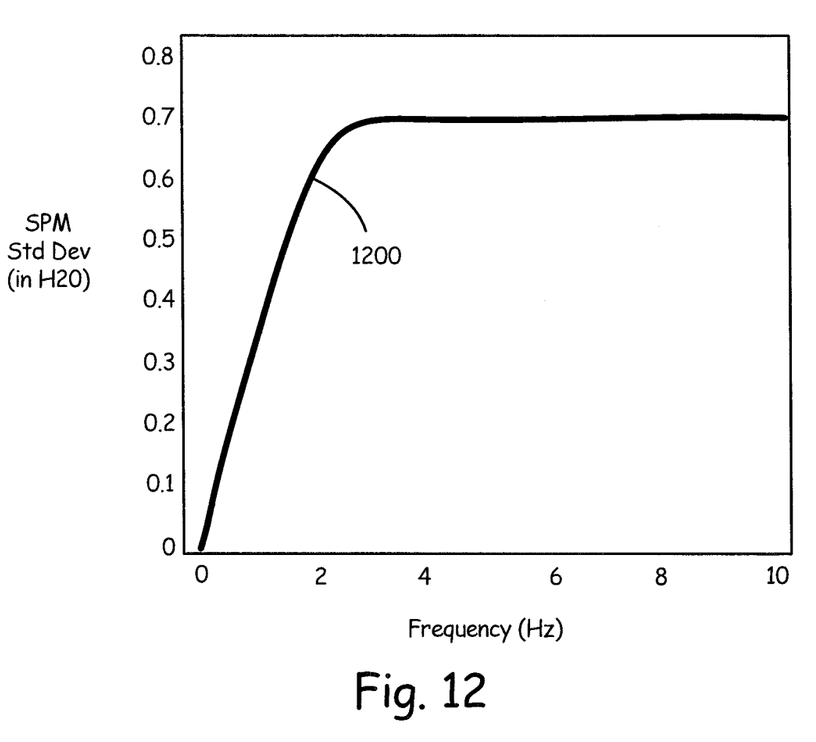
FIG. 12 is a graph of a second target frequency response for a standard deviation of a differential pressure signal.

In still further embodiments, the target frequency response can be the standard deviation frequency response formed by a combination of a model sensor with a constant frequency response and a model high pass filter such as a high pass difference filter. FIG. 12 provides a graph of a target frequency response 1200 produced by a combination of a model sensor with a constant frequency response at all operating temperatures and a difference high pass filter. If the target frequency response of FIG. 12 is used, variations in the sensor response due to temperature, operating range, and frequency are normalized.

At step 1004, a filter fitting unit 922 constructs filter parameters 924 for a high pass filter constructed from the target frequency response and the sensor frequency response at each temperature. Thus, filter fitting unit 922 constructs a separate high pass filter for each temperature.

Filter fitting 922 constructs the filter by first generating a frequency response for the filter as:

$$H(\omega, T) = \frac{D(\omega)}{A(\omega, T)} \qquad \text{EQ. 1}$$

Where $D(\omega)$ is the target standard deviation frequency response, $A(\omega,T)$ is the sensor frequency response at temperature T and $H(\omega,T)$ is the frequency response for the constructed filter at temperature T.

Once the frequency response for the filter has been determined using EQ. 1 above, parameters for the high pass filter are determine to achieve the frequency response for the filter. In accordance with one embodiment, the high pass filter is constructed as a finite impulse response filter which takes the form of:

$$y_k = \sum_{i=0}^{N} b_i x_{k-i}$$ EQ. 2

Where N is the order of the filter and $b_0, b_1, b_2, \ldots b_N$ are the coefficients of the filter.

Within the class of FIR filters there is a set of filters known as Generalized Linear Phase (GLP) filters. The linear phase property is often desirable in digital filters because it reduces the amount of distortion in, for example, audio signals. There are four types of GLP filters. The GLP Type IV filter is generally well suited for diagnostics because it has exactly 0 response at DC (0 Hz), but can be given any arbitrary response at the Nyquist frequency which is one half the sampling frequency. The GLP Type IV filter requires an odd order N which results in an even number of filter coefficients. The GLP Type IV filter also has a property of anti-symmetry in the coefficients meaning that $b_i = -b_{N-i}$. The high pass differencing filter $$y_k = \frac{x_k - x_{k-1}}{2}$$

is actually a very simple GLP Type IV filter with order N=1. Using a heuristic approach, the present inventors have discovered that an order 5 GLP Type IV filter provides good curve fitting to the standard deviation frequency response computed using EQ. 1 at each of the different temperatures.

An order 5 GLP Type IV filter is expressed as:

$$y_k = b_2 x_k + b_1 x_{k-1} + b_2 x_{k-2} - b_2 x_{k-3} - b_1 x_{k-4} - b_0 x_{k-5}$$ EQ. 3

Where $y_k$ is the output of the filter at $x_k$, $x_{k-1}$, $x_{k-2}$, $x_{k-3}$, $x_{k-4}$, and $x_{k-5}$ are the sensor measurement values at $x_k$, $x_{k-1}$, $x_{k-2}$, $x_{k-3}$, $x_{k-4}$, and $x_{k-5}$, respectively, and $b_0$, $b_1$, and $b_2$ are the parameters of the high pass filter. Note that although there are six multiply operations in EQ. 3, there are only three unique coefficients $b_0$, $b_1$, and $b_2$. As a result, filter fitting unit 922 only has to determine the values of $b_0$, $b_1$, and $b_2$ when constructing a filter to achieve the standard deviation frequency response computed by EQ. 1.

Any known numerical digital filter design algorithm, such as Window Design, Frequency Sampling, Weighted Least Squares, Equiripple, Remez Exchange, and Parks-McClellan, for example, may be used to identify the values of that best fit the filter computed in Eq. 1.

The values of b0, b1, and b2 determined at step 1004 are stored as filter parameters 924 at step 1006 for each temperature.

Figure 13:
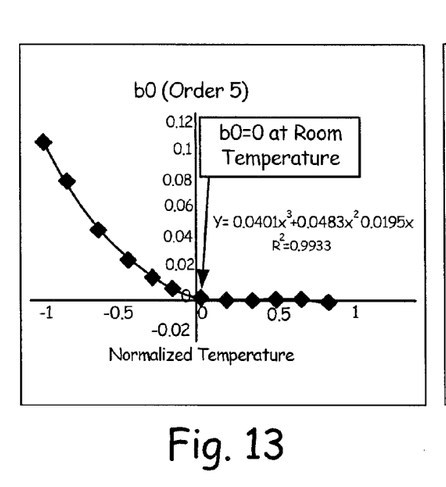
FIG. 13 provides a graph of filter parameter $b_0$ as a function of temperature.
Figure 14:
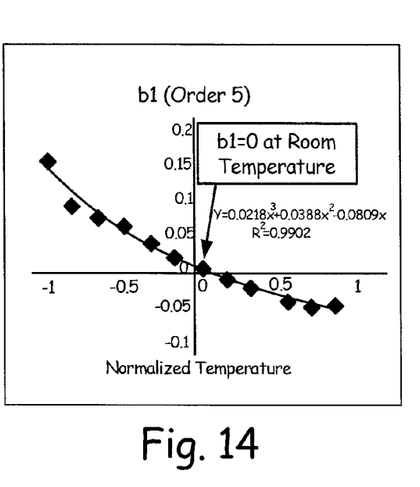
FIG. 14 provides a graph of filter parameter $b_1$ as a function of temperature.
Figure 15:
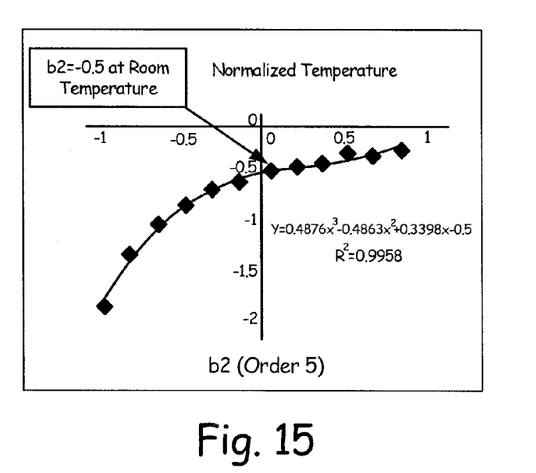
FIG. 15 provides a graph of filter parameter $b_2$ as a function of temperature.

FIGS. 13, 14 and 15 provide graphs of the values of $b_0$, $b_1$, and $b_2$ needed to achieve a desired frequency response for the standard deviation at various temperatures. In FIGS. 13, 14 and 15, normalized temperature is shown along the horizontal axis varying from −1 to 1 where a normalized temperature value is computed as:

$$t = \frac{T - 75}{115}$$ EQ. 4

The vertical axis in FIGS. 13, 14 and 15 represent the values of the parameters. At room temperature, $b_0$ and $b_1$ are set to 0 and $b_2$ is set to −0.5. To achieve this, all of the parameter values are shifted by an amount to require that $b_0$, $b_1$, and $b_2$ have these values at room temperature. By ensuring that $b_0=0$, $b_1=0$, and $b_2=-0.5$, embodiments described herein ensure that the high pass filter will operate as a difference filter at room temperature.

At step 1008, a parameter curve fitting 926 fits a curve to the parameter values shown in FIGS. 13, 14 and 15. In accordance with one embodiment, a third order curve as a function of normalized temperature is fit to each parameter value set according to:

$$b_i = a_{i,0} + a_{i,1} t + a_{i,2} t^2 + a_{i,3} t^3, \text{for } i=0,1,2$$ EQ. 5

Where t represents the normalized temperature, $a_{i,0}$, $a_{i,1}$, $a_{i,2}$, and $a_{i,3}$ are the coefficients for the filter parameter curves and $b_i$ is the filter parameter.

At step 1010, a coefficient matrix is constructed from the temperature curves to produce coefficient matrix 928. An example of such a coefficient matrix is:

$$A = \begin{bmatrix} a_{0,0} & a_{0,1} & a_{0,2} & a_{0,3} \\ a_{1,0} & a_{1,1} & a_{1,2} & a_{1,3} \\ a_{2,0} & a_{2,1} & a_{2,2} & a_{2,3} \end{bmatrix}$$ EQ. 6

Note that the coefficient matrix is not necessary but aids in the understanding and the computation of the filter parameters.

After the coefficient matrix has been constructed, the field device is prepared to dynamically construct temperature-dependent high pass filters to reach the target frequency response selected at step 1002 for any temperature of the sensor. At step 1012, temperature value 932 representing the temperature of the sensor measured by PRT 256 is provided to filter construction unit 930. At step 1014, filter construction unit 930 uses EQ. 4 to determine a normalized temperature. At step 1016, filter construction unit 930 uses the coefficient matrix 928 and the normalized temperature to calculate the values of the filter parameters, $b_0$, $b_1$, and $b_2$. In particular, the coefficient matrix of EQ. 6 multiplies a temperature matrix of:

$$T = \begin{bmatrix} t \\ t^2 \\ t^3 \end{bmatrix}$$ EQ. 7

Where T is the temperature matrix and t is the normalized temperature.

At step 1018, the filter parameters are stored as high pass filter 902 and are applied to measurements 900, which may be stored in NVRAM 266 or may be processed as they are received by processor 264 from processor 258. The measurements 900 comprise a series of sensor values that together represent a sensor signal. The output of high pass filter 902 is filtered signal 904, which is applied to standard deviation calculation 906 at step 1020 to form a standard deviation 908 that has the target frequency response. At step 1022, the standard deviation is compared to the alarm thresholds and if the standard deviation crosses the alarm threshold, an alarm is activated.

Although reference to standard deviation is made above, other statistical metrics may be used such as maximum and minimum, for example, in place of the standard deviation.

Although the temperature of the sensor is used above, in other embodiments, the temperature of different parts of the system may be used in place of the temperature of the sensor. For example, in some embodiments, the temperature of an impulse line connected to a sensor may be used to construct the high pass filter. In accordance with one particular embodiment, a pressure sensor is positioned near a valve to sense cavitation at the valve. In such embodiments, the pressure sensor is connected to the valve through an impulse line. By measuring the temperature of the impulse line, the high pass filter can be constructed to compensate for temperature changes in the impulse line that affect the SPM data generated from the pressure sensor signal. This is an example of compensating on a system level versus on a transmitter or field device level.

Although the present invention has been described with reference to preferred embodiments, workers skilled in the art will recognize that changes may be made in form and detail without departing from the spirit and scope of the invention.

What is claimed is:

1. A process field device comprising:
   a process variable sensor providing a sensor signal indicative of a process variable;
   a temperature sensor providing a temperature sensor signal indicative of a temperature of the process variable sensor;
   converter circuitry for converting the sensor signal into sensor values and the temperature sensor signal into temperature values;
   a processor implementing a digital filter that filters the sensor values to produce filtered sensor values and executing statistical process monitoring instructions that compute a statistical value from the filtered sensor values, wherein the digital filter is temperature-dependent such that the filter changes as the temperature values change.

2. The process field device of claim 1 wherein the processor constructs the digital filter by applying a temperature value to an equation determined by fitting a curve to parameter values determined for filters constructed for a plurality of temperature values.

3. The process field device of claim 2 wherein the filters constructed for a plurality of temperature values are each constructed to produce a target frequency response.

4. The process field device of claim 3 wherein the target frequency response comprises a frequency response of a standard deviation of filtered sensor values.

5. The process field device of claim 3 wherein the target frequency response comprises a frequency response associated with a model sensor operating in a different range from the sensor and at a selected temperature.

6. The process field device of claim 3 wherein the target frequency response comprises a frequency response of a model sensor with a constant frequency response at all temperatures.

7. A control system comprising:
   a filter that filters a series of sensor values to produce filtered values; and
   a statistical process monitoring unit that determines a statistical value from the filtered values and that issues an alert when the statistical value crosses a threshold, wherein the filter filters the sensor values to achieve a desired frequency response in the statistical value that matches a frequency response in the statistical value produced from sensor values generated by a sensor operating in a selected range.

8. The control system of claim 7 wherein the filter comprises a temperature-dependent filter that is constructed by applying the temperature value to respective equations that each define a separate parameter of the filter.

9. The control system of claim 8 wherein each equation is constructed by fitting a curve to values of a filter parameter determined at different temperatures.

10. The control system of claim 7 wherein the desired frequency response of the statistical value further matches a frequency response in the statistical value produced from sensor values generated by the sensor operating at a selected temperature.

11. The control system of claim 7 wherein the desired frequency response of the statistical value comprises a frequency response produced at least in part by a sensor operating in a different range from a sensor that produced the series of sensor values.

12. The control system of claim 7 wherein the desired frequency response of the statistical value comprises a frequency response produced at least in part by a sensor that was manufactured differently from a sensor that produced the series of sensor values.

* * * * *